(12) United States Patent
Figurà

(10) Patent No.: US 9,092,134 B2
(45) Date of Patent: Jul. 28, 2015

(54) USER TOUCH DISPLAY INTERFACE PROVIDING AN EXPANDED SELECTION AREA FOR A USER SELECTABLE OBJECT

(75) Inventor: Paul Figurà, Pointe-Claire (CA)

(73) Assignee: Nokia Technologies Oy, Espoo (FI)

( * ) Notice: Subject to any disclaimer, the term of this patent is extended or adjusted under 35 U.S.C. 154(b) by 679 days.

(21) Appl. No.: 12/365,031

(22) Filed: Feb. 3, 2009

(65) Prior Publication Data
US 2009/0319935 A1    Dec. 24, 2009

Related U.S. Application Data

(60) Provisional application No. 61/025,858, filed on Feb. 4, 2008.

(51) Int. Cl.
*G06F 3/0488*   (2013.01)
*G06F 3/023*    (2006.01)

(52) U.S. Cl.
CPC .......... *G06F 3/04886* (2013.01); *G06F 3/0237* (2013.01)

(58) Field of Classification Search
CPC .................................................. G06F 3/04886
USPC ........................................................ 715/773
See application file for complete search history.

(56) References Cited

U.S. PATENT DOCUMENTS

| | | | | |
|---|---|---|---|---|
| 5,627,567 | A * | 5/1997 | Davidson | 345/173 |
| 5,736,974 | A * | 4/1998 | Selker | 715/862 |
| 5,963,671 | A * | 10/1999 | Comerford et al. | 382/230 |
| 6,073,036 | A * | 6/2000 | Heikkinen et al. | 455/550.1 |
| 6,169,538 | B1 * | 1/2001 | Nowlan et al. | 345/168 |
| 6,292,179 | B1 | 9/2001 | Lee | |
| 6,573,844 | B1 * | 6/2003 | Venolia et al. | 341/22 |
| 6,985,137 | B2 * | 1/2006 | Kaikuranta | 345/175 |
| 7,103,852 | B2 * | 9/2006 | Kairis, Jr. | 715/800 |
| 7,154,483 | B2 * | 12/2006 | Kobayashi | 345/173 |
| 7,443,316 | B2 * | 10/2008 | Lim | 341/22 |
| 7,526,738 | B2 * | 4/2009 | Ording et al. | 715/862 |
| 7,694,231 | B2 * | 4/2010 | Kocienda et al. | 715/773 |
| 7,793,228 | B2 * | 9/2010 | Mansfield et al. | 715/780 |
| 7,957,955 | B2 * | 6/2011 | Christie et al. | 704/9 |

(Continued)

FOREIGN PATENT DOCUMENTS

| | | | |
|---|---|---|---|
| DE | 10210637 | * | 10/2003 |
| DE | 10210637 A1 | | 10/2003 |

OTHER PUBLICATIONS

Apple, "Iphone User Guide", iPhone first generation, released on Jun. 29, 2007, 124 pages.*

(Continued)

*Primary Examiner* — Reza Nabi
(74) *Attorney, Agent, or Firm* — Harrington & Smith

(57) ABSTRACT

In accordance with an example embodiment of the present invention, an apparatus comprising a user interface configured to: display a plurality of selectable objects on a display, each of the plurality of selectable objects having a selection area. The apparatus further comprises a processor configured to: receive a user input within the selection area to select a first object, the first object being at least one of the plurality of selectable objects. Further, the apparatus comprises the user interface further configured to display an expanded selection area for the first object based at least in part on the user input.

18 Claims, 9 Drawing Sheets

(56) References Cited

U.S. PATENT DOCUMENTS

| | | | |
|---|---|---|---|
| 8,289,286 B2* | 10/2012 | Stallings et al. | 345/173 |
| 8,381,118 B2* | 2/2013 | Minton | 715/773 |
| 8,471,825 B2* | 6/2013 | Miyazaki | 345/173 |
| 2002/0152267 A1* | 10/2002 | Lennon | 709/203 |
| 2003/0034185 A1* | 2/2003 | Kaikuranta | 178/18.01 |
| 2004/0160419 A1* | 8/2004 | Padgitt | 345/173 |
| 2004/0178994 A1* | 9/2004 | Kairls, Jr. | 345/173 |
| 2005/0140660 A1* | 6/2005 | Valikangas | 345/173 |
| 2007/0152978 A1* | 7/2007 | Kocienda et al. | 345/173 |
| 2007/0229476 A1* | 10/2007 | Huh | 345/173 |
| 2009/0251422 A1* | 10/2009 | Wu et al. | 345/173 |
| 2009/0319935 A1* | 12/2009 | Figura | 715/773 |
| 2009/0327977 A1* | 12/2009 | Bachfischer et al. | 715/863 |
| 2010/0026723 A1* | 2/2010 | Nishihara et al. | 345/671 |
| 2010/0060585 A1* | 3/2010 | Chiu | 345/168 |
| 2010/0066764 A1* | 3/2010 | Refai | 345/660 |
| 2010/0097337 A1* | 4/2010 | Lin et al. | 345/173 |
| 2010/0141597 A1* | 6/2010 | Lim | 345/173 |
| 2010/0333011 A1* | 12/2010 | Kornev et al. | 715/773 |
| 2011/0082619 A1* | 4/2011 | Small et al. | 701/29 |
| 2011/0083104 A1* | 4/2011 | Minton | 715/815 |
| 2011/0221693 A1* | 9/2011 | Miyazaki | 345/173 |
| 2011/0319139 A1* | 12/2011 | Kondo | 455/566 |
| 2012/0182237 A1* | 7/2012 | Yun | 345/173 |
| 2014/0164973 A1* | 6/2014 | Greenzeiger et al. | 715/773 |
| 2014/0192004 A1* | 7/2014 | Andersson et al. | 345/173 |

OTHER PUBLICATIONS

International Search Report and Written Opinion, received in correspnding PCT Application No. PCT/IB2009/000202, issued by European Patent Office (ISA), Jul. 29, 2009, 14 pages.

* cited by examiner

USER TOUCH DISPLAY INTERFACE PROVIDING AN EXPANDED SELECTION AREA FOR A USER SELECTABLE OBJECT

RELATED APPLICATIONS

This application claims priority to U.S. Application No. 61/025,858, entitled METHOD AND DEVICE FOR IMPROVED USER INPUT ACCURACY, filed Feb. 4, 2008, which is hereby incorporated by reference in its entirety.

TECHNICAL FIELD

The present application relates generally to improved user input accuracy.

BACKGROUND

An electronic device has a user interface to use applications. Further, there may be different types of user interfaces. The electronic device facilitates application use using these different types of user interfaces.

SUMMARY

Various aspects of examples of the invention are set out in the claims.

According to a first aspect of the present invention, an apparatus comprising a user interface configured to: display a plurality of selectable objects on a display, each of the plurality of selectable objects having a selection area. The apparatus further comprises a processor configured to: receive a user input within the selection area to select a first object, the first object being at least one of the plurality of selectable objects. Further, the apparatus comprises the user interface further configured to display an expanded selection area for the first object based at least in part on the user input.

According to a second aspect of the present invention, a method, comprising displaying a plurality of selectable objects, each of the plurality of selectable objects having a selection area, receiving a user input within the selection area to select a first object, the first object being at least one of the plurality of selectable objects, and displaying an expanded selection area for the first object based at least in part on the user input.

BRIEF DESCRIPTION OF THE DRAWINGS

For a more complete understanding of example embodiments of the present invention, reference is now made to the following descriptions taken in connection with the accompanying drawings in which.

DETAILED DESCRIPTION OF THE DRAWINGS

An example embodiment of the present invention and its potential advantages are best understood by referring to FIGS. 1 through 6 of the drawings.

Figure 1:
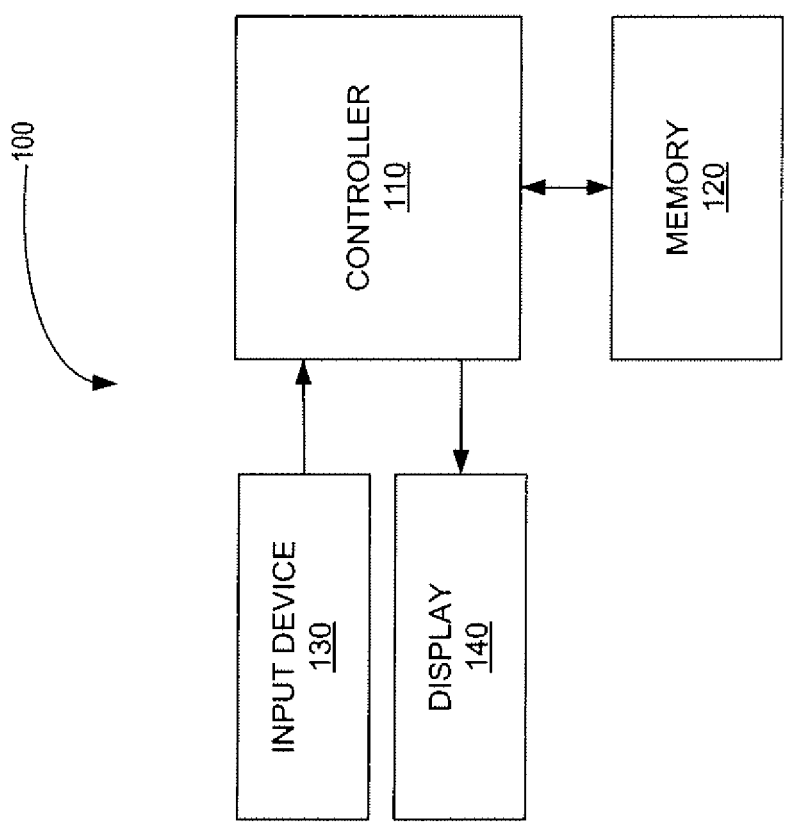
FIG. 1 is a block diagram depicting an electronic device operating in accordance with an example embodiment of the invention.

FIG. 1 is a block diagram depicting an electronic device 100 operating in accordance to an example embodiment of the invention. In an example embodiment, the electronic device 100 comprises a processor 110, memory 120, an input device 130, a display 140, and/or the like. In an embodiment the processor 110 is the same as a controller. In an alternative embodiment, the processor 110 is different than the controller.

In an embodiment, the processor 110 comprises one or more microprocessors, hardware, firmware, a combination thereof, and/or the like. The processor 110 may control the electronic device 100 according to instructions and data stored in memory 120. In an embodiment, the electronic device 100 may comprise memory 120. For example, the electronic device 100 may comprise volatile memory, such as random access memory (RAM). Volatile memory may comprise a cache area for the temporary storage of data. Further, the electronic device 100 may also comprise non-volatile memory, which may be embedded and/or may be removable. The non-volatile memory may also comprise an electrically erasable programmable read only memory (EEPROM), flash memory, and/or the like. In an alternative embodiment, the processor 110 may comprise memory 120. For example, the processor 110 may comprise volatile memory, non-volatile memory, and/or the like.

In an embodiment, the electronic device 100 may use memory to store any of a number of pieces of information and/or data to implement one or more features of the electronic device 100. Further, the memory may comprise an identifier, such as international mobile equipment identification (IMEI) code, capable of uniquely identifying the electronic device 100. The memory may store one or more instructions for determining cellular identification information based at least in part on the identifier. For example, the processor 110, using the stored instructions, may determine an identity, e.g., cell id identity or cell id information, of a communication with the electronic device 100.

In an embodiment, the processor 110 of the electronic device 100 may comprise circuitry for implementing audio feature, logic features, and/or the like. For example, the processor 110 may comprise a digital signal processor device, a microprocessor device, a digital to analog converter, other support circuits, and/or the like. In an embodiment, control and signal processing features of the processor 110 may be allocated between devices, such as the devices describe above, according to their respective capabilities. Further, the processor 110 may also comprise an internal voice coder and/or an internal data modem. Further still, the processor 110 may comprise features to operate one or more software programs. For example, the processor 110 may be capable of operating a software program for connectivity, such as a conventional Internet browser. Further, the connectivity program may allow the electronic device 100 to transmit and receive Internet content, such as location-based content, other web page content, and/or the like. In an embodiment, the electronic device 100 may use a wireless application protocol (WAP), hypertext transfer protocol (HTTP), file transfer protocol (FTP) and/or the like to transmit and/or receive the Internet content.

In an embodiment, the input device 130 and/or display 140 of the electronic device 100 provides a user interface to enable the user to control and interact with the electronic device 100. Input device 130 may, for example, comprise keypads, one or more functional selectable objects, e.g., keys, touch screen, touch pad, joystick control, mouse, and/or the like. Display 140 may, for example, comprise a liquid crystal display, an organic light emitting device, a cathode ray tube, and/or the like. A touch screen display may also be used as an input device 130 and/or display 140.

In an embodiment, the electronic device 100 may be capable of operating in accordance with any of a number of a first generation communication protocol, a second generation communication protocol, a third generation communication protocol, a fourth generation communication protocol, and/or the like. For example, the electronic device 100 may be capable of operating in accordance with second generation (2G) communication protocols IS-136, time division multiple access (TDMA), global system for mobile communication (GSM), IS-95 code division multiple access (CDMA), and/or the like. Further, the electronic device 100 may be capable of operating in accordance with third-generation (3G) communication protocols, such as Universal Mobile Telecommunications System (UMTS), CDMA2000, wideband CDMA (WCDMA), time division-synchronous CDMA (TD-SCDMA), and/or the like. Further still, the electronic device 100 may also be capable of operating in accordance with 3.9 generation (3.9G) wireless communication protocols, such as Evolved Universal Terrestrial Radio Access Network (E-UTRAN) or the like, or wireless communication projects, such as long term evolution (LTE) or the like. Still further, the electronic device 100 may be capable of operating in accordance with fourth generation (4G) communication protocols.

In an alternative embodiment, the electronic device 100 may be capable of operating in accordance with a non-cellular communication mechanism. For example, the electronic device 100 may be capable of communication in a wireless local area network (WLAN), other communication networks, and/or the like. Further, the electronic device 100 may communicate in accordance with techniques, such as radio frequency (RF), infrared (IrDA), any of a number of WLAN techniques. For example, the electronic device 100 may communicate using one or more of the following WLAN techniques: IEEE 802.11, e.g., 802.11a, 802.11b, 802.11g, 802.11n, and/or the like. Further, the electronic device 100 may also communicate, via a world interoperability, to use a microwave access (WiMAX) technique, such as IEEE 802.16, and/or a wireless personal area network (WPAN) technique, such as IEEE 802.15, BlueTooth (BT), ultra wideband (UWB), and/or the like.

It should be understood that the communications protocols described above may employ the use of signals. In an example embodiment, the signals comprises signaling information in accordance with the air interface standard of the applicable cellular system, user speech, received data, user generated data, and/or the like. In an embodiment, the electronic device 100 may be capable of operating with one or more air interface standards, communication protocols, modulation types, access types, and/or the like. It should be further understood that the electronic device 100 is merely illustrative of one type of electronic device that would benefit from embodiments of the invention and, therefore, should not be taken to limit the scope of embodiments of the invention.

While embodiments of the electronic device 100 are illustrated and will be hereinafter described for purposes of example, other types of electronic devices, such as a portable digital assistant (PDA), a pager, a mobile television, a gaming device, a camera, a video recorder, an audio player, a video player, a radio, a mobile telephone, a traditional computer, a portable computer device, a global positioning system (GPS) device, a GPS navigation device, a GPS system, a mobile computer, a browsing device, an electronic book reader, a combination thereof, and/or the like, may be used. While several embodiments of the invention may be performed or used by the electronic device 100, embodiments may also be employed by a server, a service, a combination thereof, and/or the like.

Figure 2:
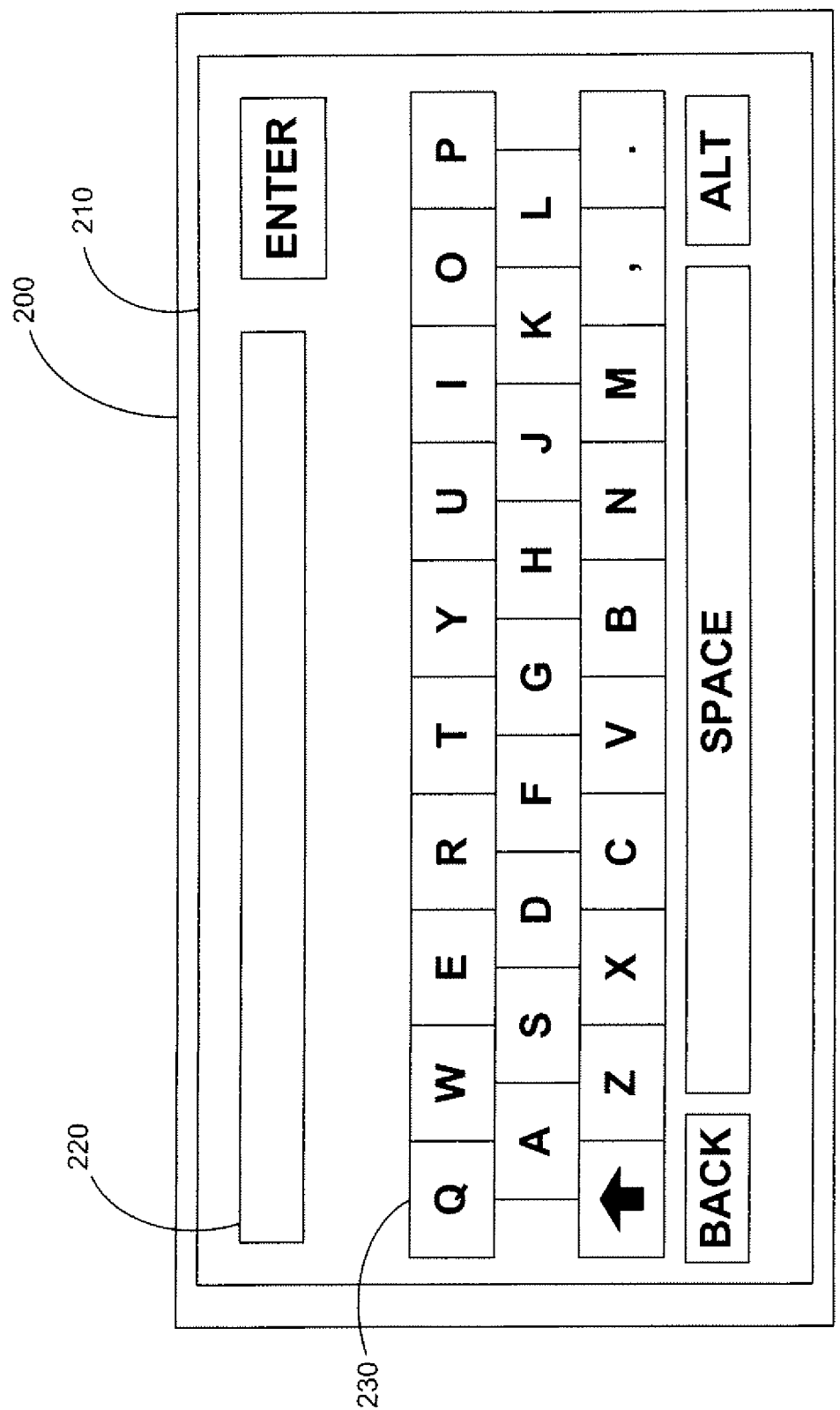
FIG. 2 is a block diagram of a touch screen on an electronic device operating in accordance with an example embodiment of the invention.

FIG. 2 is a block diagram of a touch screen 200 on an electronic device operating in accordance with an example embodiment of the invention. In an example embodiment, the touch screen 200 comprises an input device and/or a display. In an example embodiment, the touch screen 200 displays a virtual keyboard 210. The virtual keyboard 210 comprises a text input area 220, a plurality of selectable objects 230, and/or the like. In operation, a user of the touch screen 200 uses a user pointer, such as a stylus, a finger, and/or the like, to select and/or actuate one or more of the plurality of selectable objects 230 to input text into the text input area 220. In an embodiment, the virtual keyboard 210 may be utilized by a user of an electronic device 100, such as electronic device 100, to input text for a specific application, such as e-mail, instant messaging, browsing, and/or the like.

In an embodiment, the touch screen 200 is on a smart phone. In an embodiment, the smart phone comprises a plurality of selectable objects 230. The plurality of selectable objects 230 may be smaller than a user's fingertip thereby rendering limited space between each of the plurality of selectable objects 230. This limited space may result in erroneous selection by the user. For example, the smart phone comprises a touch screen of about 68 millimeter (mm) wide and about 40.8 mm high, and about 400 pixels wide by about 240 pixels high. Such a touch screen, when displaying the virtual keyboard 210, displays each of the plurality of selectable objects 230 with a size of about 37 pixels wide by about 33 pixels high, e.g., less than about 7 mm wide and less than about 6 mm high.

Figure 3:
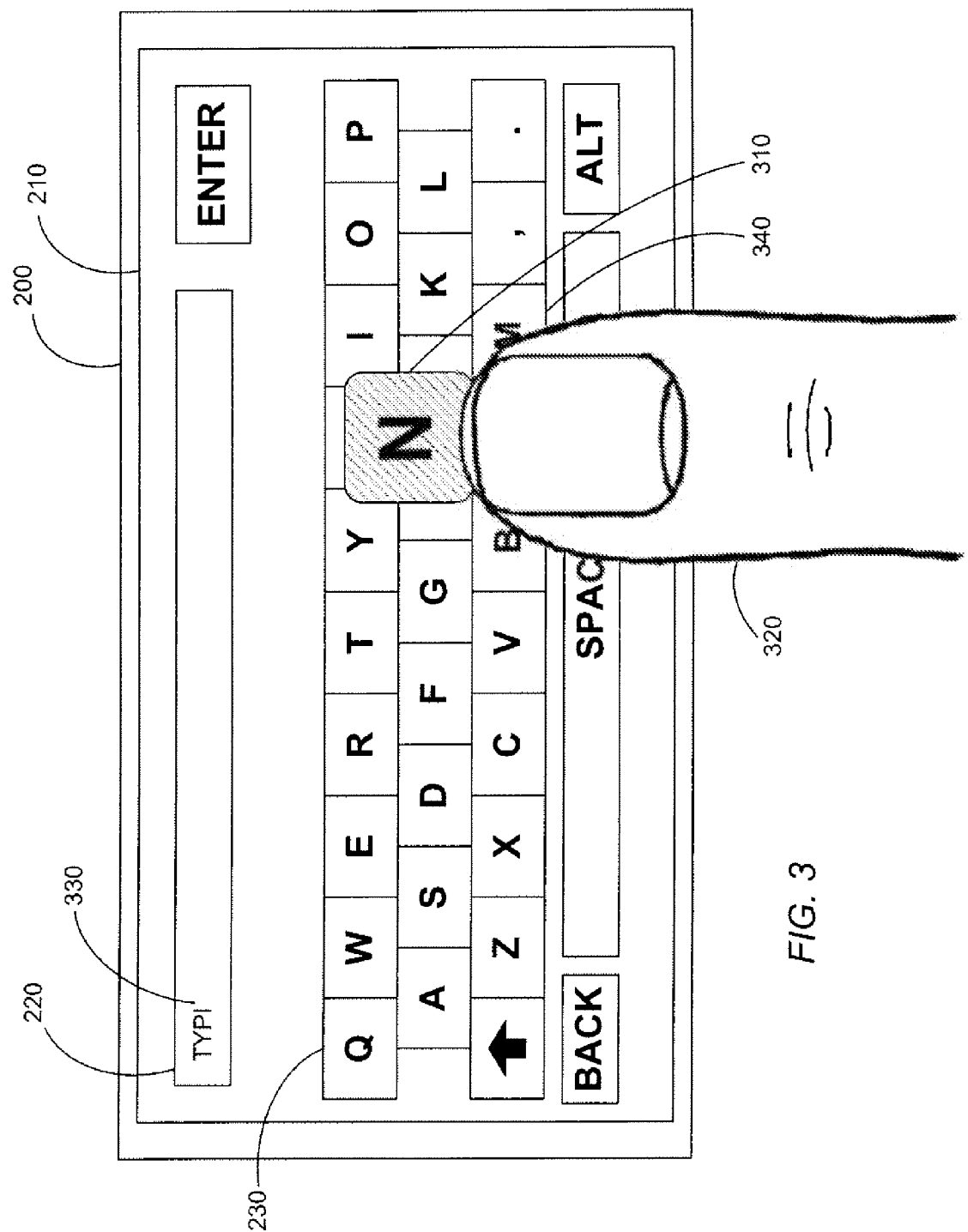
FIG. 3 is a block diagram depicting a virtual keyboard operating in accordance with an example embodiment of the invention.

FIG. 3 is a block diagram depicting a virtual keyboard 210 operating in accordance with an example embodiment of the invention. In an example embodiment, the touch screen 200 provides no tactile feedback for selection of the plurality of selectable objects 230. In such a case, a user may have difficulty maintaining an intended location on the virtual keyboard 210. Further, the user may want to continuously look at the plurality of selectable objects 230 and/or a text input area 220 during selection. In an example embodiment, a user interface is configured to display a plurality of selectable objects on a display, each of the plurality of selectable objects having a selection area. For example, the touch screen 200 displays a plurality of selectable objects 230. Further, a processor is configured to receive a user input within the selection area to select a first object, the first object being at least one of the plurality of selectable objects. For example, a user selects the letter "T." In such a case, the user interface is further configured to display an expanded selection area for the first object based at least in part on the user input. For example, the touch screen 200 displays an indicator 310, e.g., the letter "T." The user may then confirm the selection by clicking or otherwise actuating the selection.

Consider the following example. The user desires to input the word "TYPING" into the text input area 220. The user enters "TYPI" as shown in the input text 330. The user then selects the letter "N." The indicator 310 displays an "N" key 340 representing the current selection. In such a case, the user may drag a user pointer 320 in the appropriate direction, for example, to the left until the indicator 310 display the letter "N" key. The user may release the user pointer 320 to append an "N" to the input text 330 thereby selecting the letter.

A technical effect of one or more of the example embodiments disclosed herein is improving user input accuracy on an electronic device by providing an expanded selection area for a selected object. The expanded selection area reduces errors caused by unintentional user pointer dragging associated with user pointer release.

Figure 4:
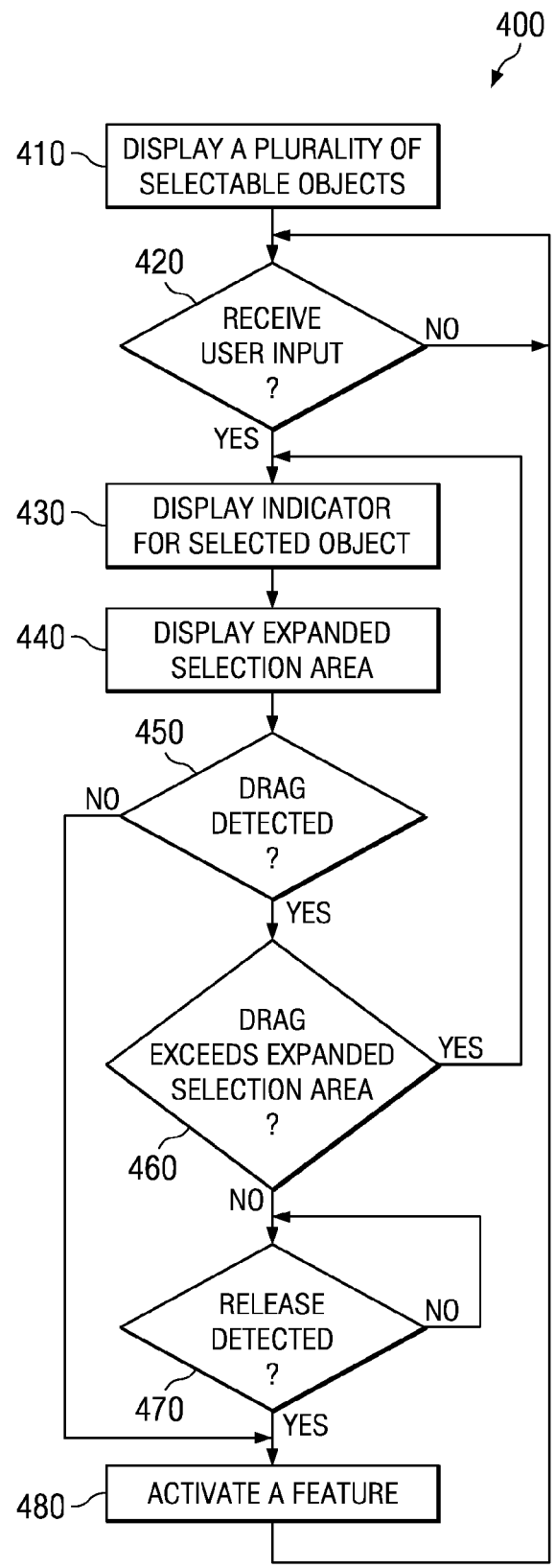
FIG. 4 is a flow diagram depicting an example method for activating a feature in accordance with an example embodiment of the invention.

FIG. 4 is a flow diagram depicting an example method 400 for activating a feature in accordance with an example embodiment of the invention. Example method 400 may be performed by an electronic device, such as electronic device 100 of FIG. 1.

At 410, a plurality of selectable objects is displayed. In an example embodiment, a user interface, such as touch screen 200 of FIG. 2, displays a plurality of selectable objects, such as keys on a keypad, having a selection area.

At 420, user input is received. In an example embodiment, a processor is configured to receive a user input within the selection area to select a first object, the first object being at least one of the plurality of selectable objects. For example, a user selects the letter "T", e.g., a first object.

At 430, an indicator is displayed for the selected object. In an example embodiment, the processor is configured to display an indicator to indicate the selection of the first object. For example, the processor displays an indicator for the letter "T" being selected by the user. In an embodiment, the processor is further configured to identify the selection of the first object based at least in part on the user input. In an embodiment, the processor identifies the selection of the first object using a set of Cartesian coordinates provided by an input device, such as input device 130 of FIG. 1. The input device determines the first object based at least in part on the set of Cartesian coordinates related to the first object. The input device may also employ one or more other technique, including, but not limited to, correction for offset caused by parallax.

At 440, an expanded selection area is displayed. In an example embodiment, the user interface is further configured to display an expanded selection area for the first object based at least in part on the user input. For example, the touch screen displays a larger letter "T" based on a user selection of the letter "T."

At 450, it is determined if a drag is detected. In an example embodiment, the input device determines whether the user drags a user pointer, such as a user pointer 320 of FIG. 3. For example, the user drags the pointer from the letter "T."

If at 450 it is determined that a drag is detected, then at 460 it is determined whether the drag exceeds the expanded selection area. In an example embodiment, the input device determines whether a user pointer is outside the expanded selection area. For example, the user moves the pointer outside of the expanded letter "T."

If at 460 it is determined that the drag exceeds the expanded selection area then the example method 400 continues at 430. In an example embodiment, the input device determines a second object. For example, the input device determines the user is over letter "C."

If at 460 it is determined that the drag does not exceed the expanded selection area, then at 470 it is determined if a release is detected. In an example embodiment, the input device determines whether a user release has occurred on the expanded selection area. For example, the user releases the pointer on the expanded letter "T."

If at 470 it is determined if a release is detected, then at 480 the feature is activated. For example, the user interface displays the letter "T" in a text input area, such as text input area 220 of FIG. 2. The example method 480 continues at 420 to receive a user input.

If at 470 it is determined that a release is not detected, then the example method 400 awaits a release at 470.

If at 450 it is determined that the drag is not detected, then the example method 400 continues at 480.

Figure 5A:
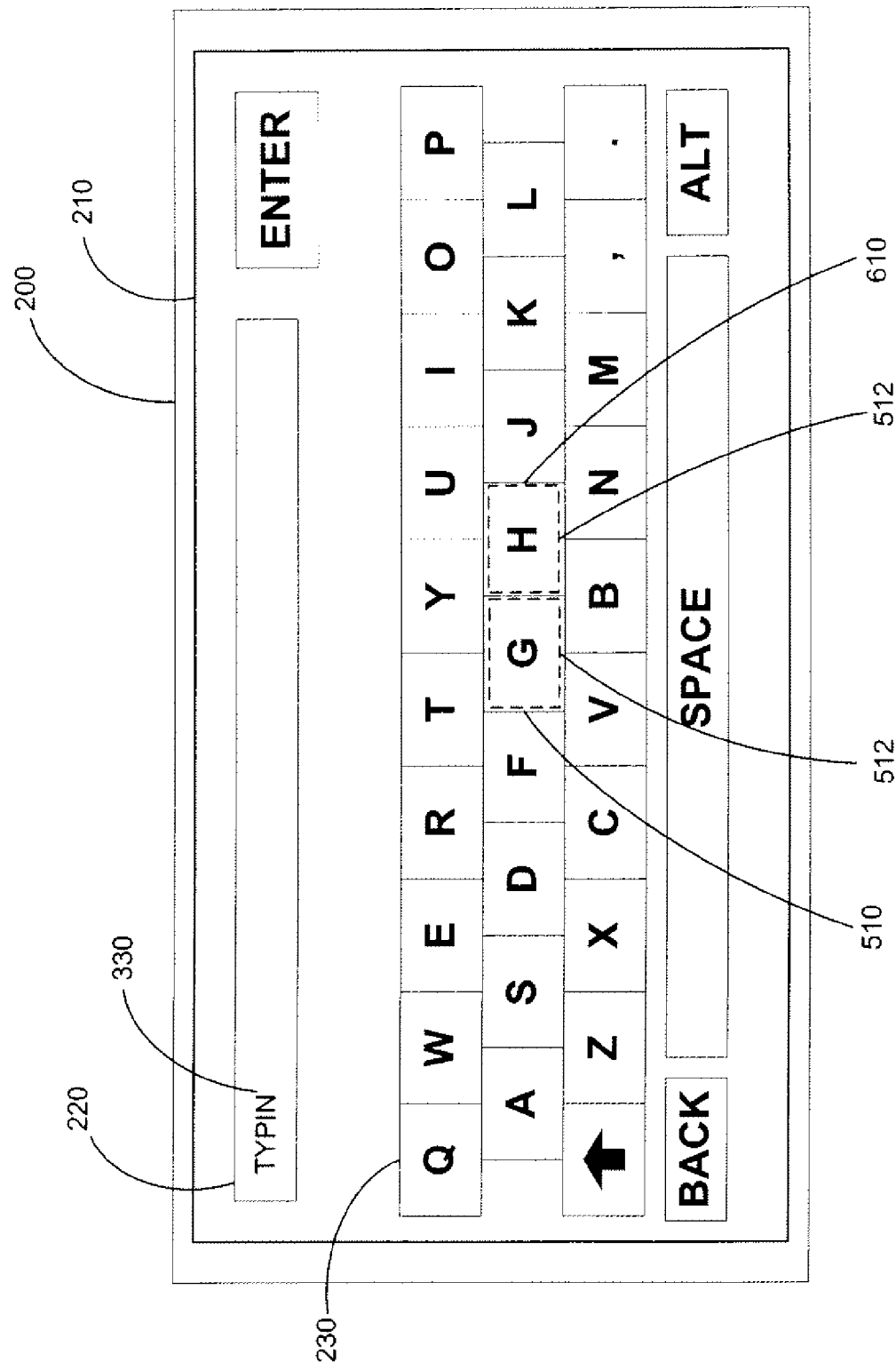
FIG. 5A is a block diagram depicting a plurality of selectable objects on a virtual keyboard operating in accordance with an example embodiment of the invention.

FIG. 5A is a block diagram depicting a plurality of selectable objects on a virtual keyboard operating in accordance with an example embodiment of the invention.

In an example embodiment, an electronic device, such as electronic device 100 of FIG. 1, comprises a touch screen 200. In an embodiment, the touch screen 200 displays a virtual keyboard 210. The virtual keyboard 210 comprises a text input area 220, a plurality of selectable objects 230, and/or the like. The virtual keyboard 210 may also comprise a normal selection area 512 and a plurality of selectable objects, such as a "G" key 510 or an "H" key 610.

As shown, the normal selection area 512 is associated with the "G" key 510 and the "H" key 610. In an embodiment, the normal selection area 512 may be visible or invisible to the user. It should be understood that the normal selection area 512 for each selectable object, e.g., key, does not need to be aligned with the boundaries, as shown. For example the normal selection area 512 could be offset from the selectable object with which the normal selection area 512 is associated.

Figure 5B:
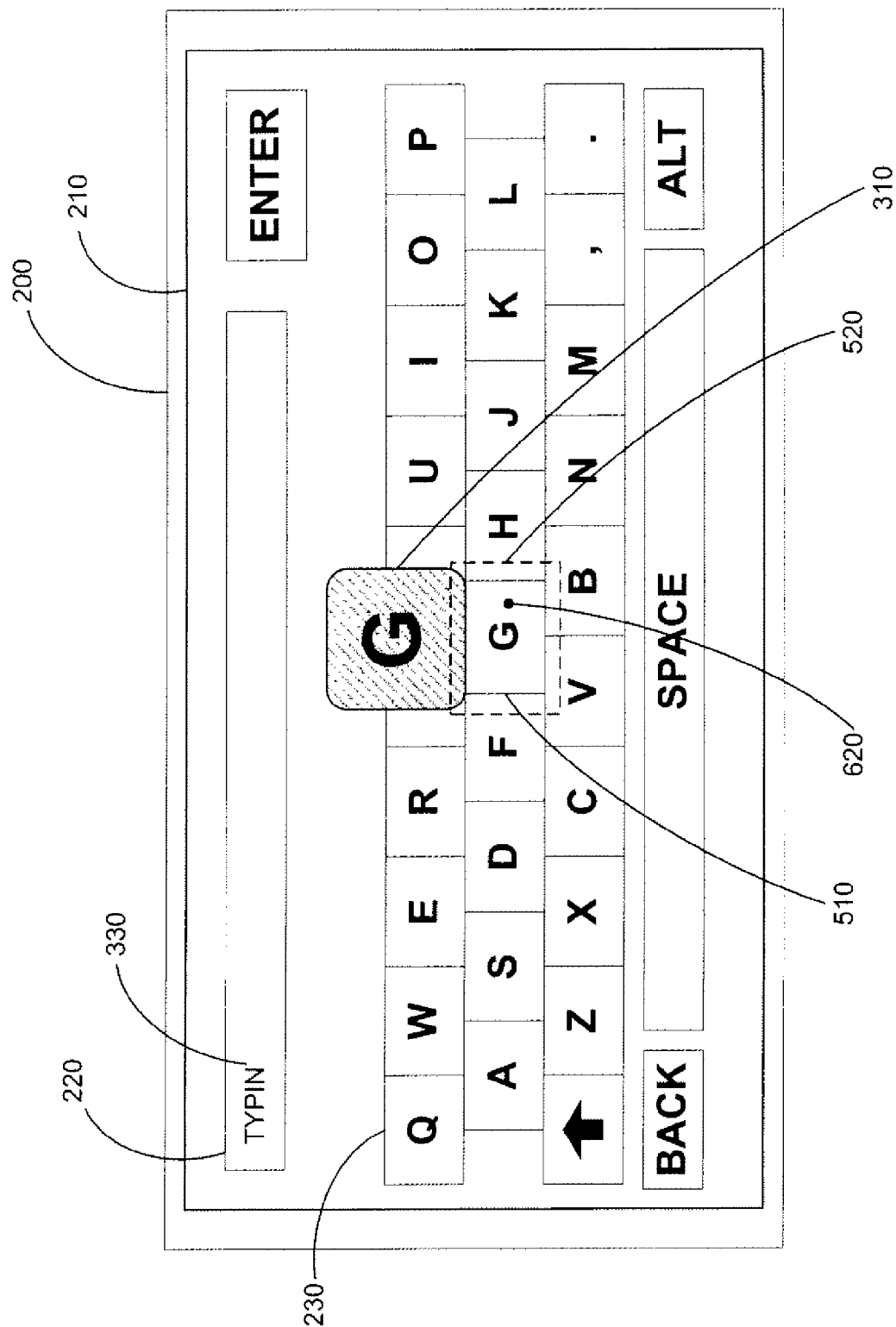
FIG. 5B is a block diagram depicting another plurality of selectable objects on a virtual keyboard operating in accordance with an example embodiment of the invention.

FIG. 5B is a block diagram depicting another plurality of selectable objects on a virtual keyboard operating in accordance with an example embodiment of the invention. In an example embodiment, an electronic device, such as electronic device 100 of FIG. 1, comprises a touch screen 200. In an embodiment, the touch screen 200 displays a virtual keyboard 210. The virtual keyboard 210 comprises a text input area 220, a plurality of selectable objects 230, and/or the like. The virtual keyboard 210 may also comprise an indicator 310, a starting location 620 and a plurality of selectable objects, such as a "G" key 510 or an "H" key 610.

In an embodiment, the touch screen 200 displays a starting location 620 for a user pointer 320, e.g., a finger or a cursor, for detection of a user input, e.g., touch or click is detected. In an embodiment, the touch screen 200 displays an indicator 310. The indicator 310 represents that the "G" key 510 is currently selected by the user pointer 320. In an embodiment, the touch screen 200 displays an expanded area 520, such as a dashed rectangle surrounding the "G" key 510. In an embodiment, a user releases the user pointer 320 to actuate the "G" key 510 in the expanded area 520. In an embodiment, the expanded area 520 may be visible or invisible to the user.

It should be understood that the expanded area 520 is generally larger than the normal selection area 512 of the "G" key 510. In an embodiment, the size of the expanded area 520 may be determined through various techniques, including, but not limited to, expanding a fixed number of pixels from each side of the outside of the normal selection area. In an embodiment, the size of the expanded area 520 is determined by providing an area of a percentage greater than a normal selection area, centered on the center of the normal selection area. Other techniques of determining the size of the expanded area 520 are also possible.

A possible technical effect of one or more of the example embodiments disclosed herein is preventing unintended actuation of one of the surrounding plurality of selectable objects 230 when the user pointer 320 is released by using the expanded area 520.

Figure 5C:
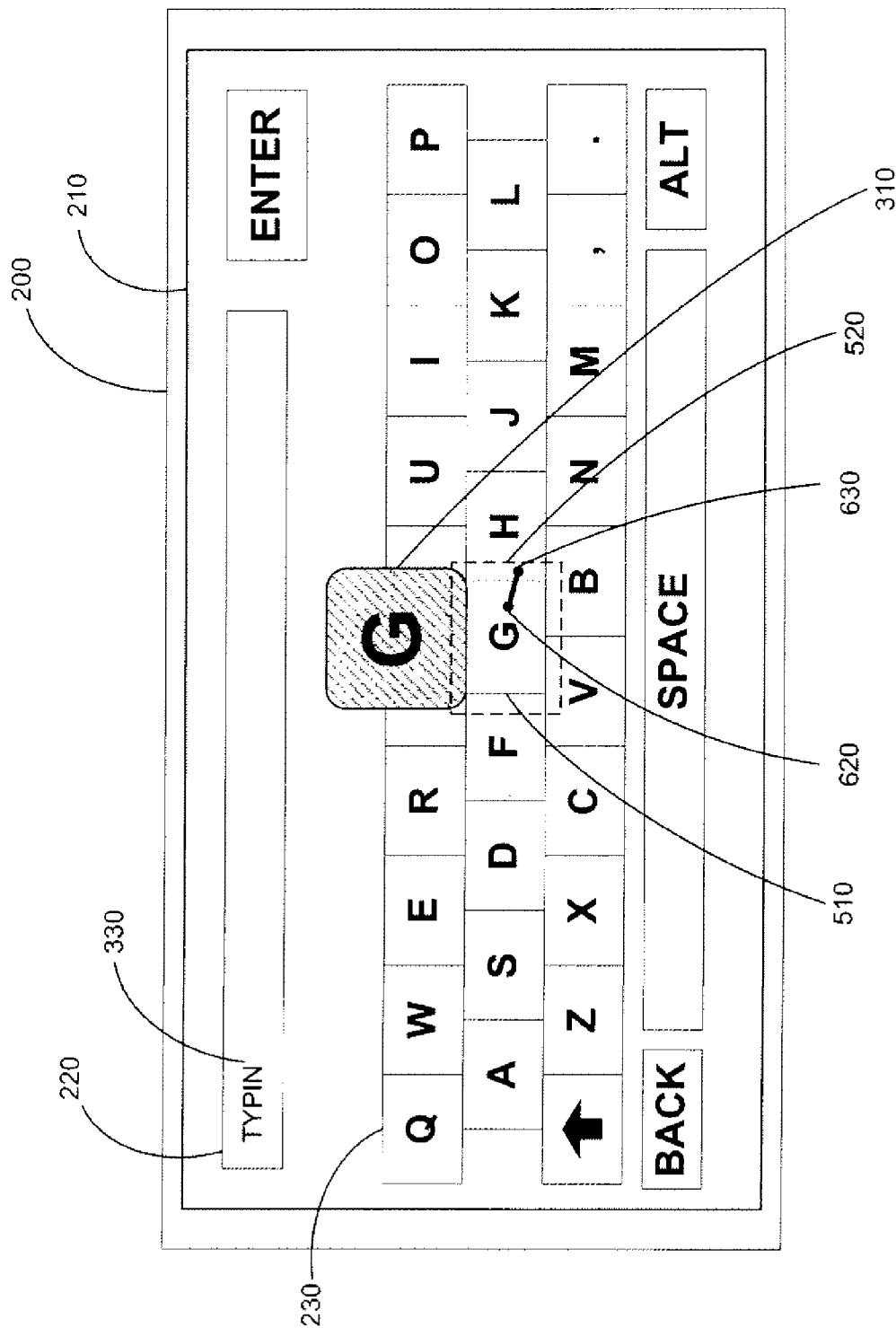
FIG. 5C is a block diagram depicting yet another plurality of selectable objects on a virtual keyboard operating in accordance with an example embodiment of the invention.

FIG. 5C is a block diagram depicting yet another plurality of selectable objects on a virtual keyboard operating in accordance with an example embodiment of the invention. In an example embodiment, an electronic device, such as electronic device 100 of FIG. 1, comprises a touch screen 200. In an embodiment, the touch screen 200 displays a virtual keyboard 210. The virtual keyboard 210 comprises a text input area 220, a plurality of selectable objects 230, and/or the like. The virtual keyboard 210 may also comprise an indicator 310, a starting location 620, a final location 630, and a plurality of selectable objects, such as a "G" key 510 or an "H" key 610.

In an embodiment, the touch screen 200 is configured to detect an accidental drag of a user pointer, such as user pointer 320 of FIG. 3. For example, the touch screen 200 detects an accidental drag of the user pointer 320 from a starting location 620 to a final location 630. The accidental drag is determined as the touch screen 200 is configured to await a selection of another selectable object, e.g., a different key. In such a case, the final location 630 of a user pointer is still within the expanded area 520, release of the user pointer 320 at the final location 630 relates to the "G" key 510. To select the "H" key 610, the user pointer 320 is to be dragged outside of the expanded area 520 and into the normal selection area 612 of the "H" key 610. In such a case, the user selects the "G" key 510.

Figure 5D:
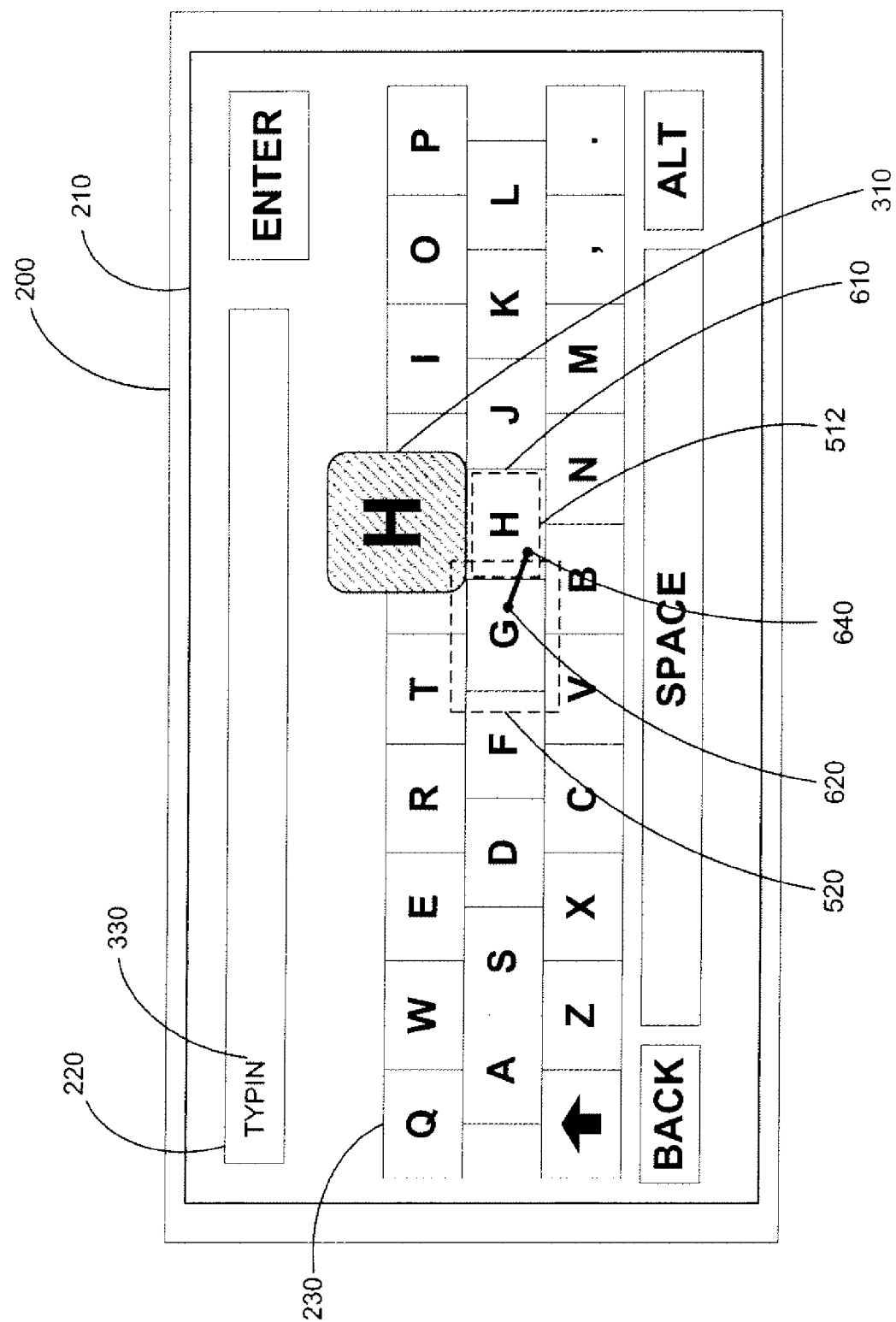
FIG. 5D is a block diagram depicting still yet another plurality of selectable objects on a virtual keyboard operating in accordance with an example embodiment of the invention.

FIG. 5D is a block diagram depicting still yet another plurality of selectable objects on a virtual keyboard operating in accordance with an example embodiment of the invention. In an example embodiment, an electronic device, such as electronic device 100 of FIG. 1, comprises a touch screen 200. In an embodiment, the touch screen 200 displays a virtual keyboard 210. The virtual keyboard 210 comprises a text input area 220, a plurality of selectable objects 230, and/or the like. The virtual keyboard 210 may also comprise an indicator 310, a starting location 620, a final location 640, and a plurality of selectable objects, such as a "G" key 510 or an "H" key 610.

In an embodiment, the touch screen 200 is configured to an intentional drag of the user pointer 320 from the starting location 620 to a final location 640. The touch screen 200 displays an indicator for the "H" key 610 based at least in part on the intentional drag of the user pointer 320 to a second selectable object, e.g., the "H" key 610. In such a case, the user selects the next letter, e.g., the "H" key 610, thereby selecting letters for a word or phrase.

Figure 6:
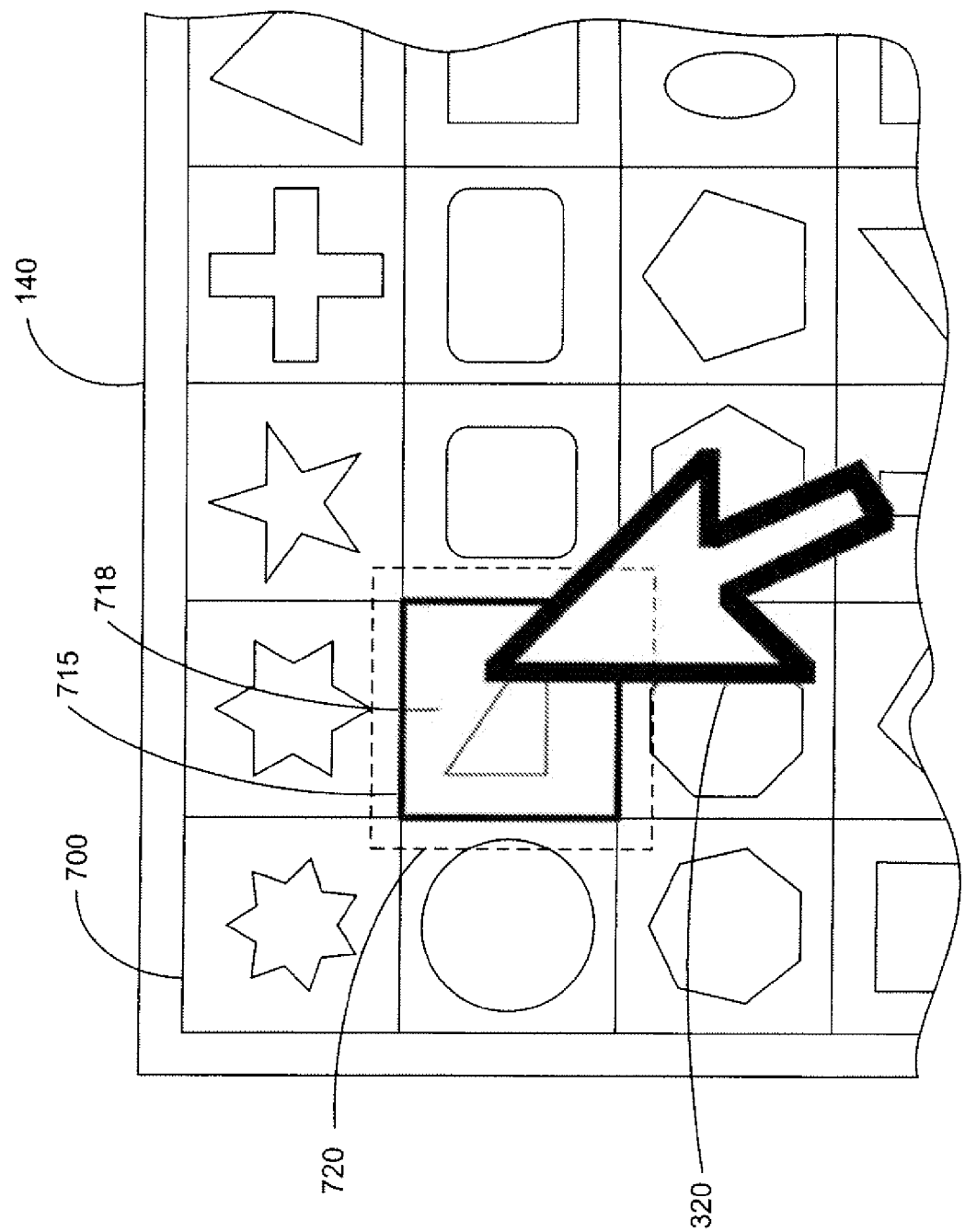
FIG. 6 is a block diagram depicting an electronic device operating in accordance with an example embodiment of the invention.

FIG. 6 is a block diagram depicting an electronic device operating in accordance with an example embodiment of the invention. In an example embodiment, an electronic device, such as electronic device 100 displays one or more square icons 700. In an example embodiment, In an example embodiment, a display 140, such as touch screen 200, displays a plurality of square icons 700 and a user pointer 320. In an embodiment, the user pointer 320, may be an arrow or other representation controlled by a user via an input device, such as input device 130 of FIG. 1. For example, optionally, if the input device is a mouse then a press and hold of the left mouse button could constitute a press of the user pointer 320. In an embodiment, movement of the mouse while the left mouse button continues to be held is dragging of the user pointer 320. Further, release of the left mouse button is a release of the user pointer 320. In an alternative embodiment, the input device 130 comprises a touch pad. In such a case, a press and hold of an appropriate probe on the touchpad is a press of the user pointer 320; movement of the probe while the probe continues to be held on the touchpad is dragging of the user pointer 320; and removal of the probe from the touchpad is a release of the user pointer 320. Similar actions are also possible with other types of input devices.

In an example embodiment, an indicator 715, shown with bolded solid square outlining, represents that a selected icon 718 of the plurality of square icons 700 is currently selected by the user pointer 320. In an embodiment, an expanded area 720 is represented by the dashed rectangle surrounding the selected icon 718. The expanded area 720 may be visible or invisible to the user. The expanded area 720 may indicate an area on the plurality of square icons 700 in which the user may release the user pointer 320 to actuate the selected icon 718. It should be understood that the expanded area 720 reduces the possibility that an accidental dragging of the user pointer 320 will cause an unintended actuation of one of the surrounding plurality of square icons 700 when the user pointer 320 is released.

Without in any way limiting the scope, interpretation, or application of the claims appearing below, a technical effect of one or more of the example embodiments disclosed herein may be improving user input accuracy on a electronic device by providing an expanded selection area for a selected object. Another technical effect of one or more of the example embodiments disclosed herein may be preventing unintended actuation of one of the surrounding plurality of selectable objects when a user pointer is released by using an expanded area.

Embodiments of the present invention may be implemented in software, hardware, application logic or a combination of software, hardware and application logic. The software, application logic and/or hardware may reside on an electronic device, server, or service. If desired, part of the software, application logic and/or hardware may reside on an electronic device, part of the software, application logic and/or hardware may reside on a server, and part of the software, application logic and/or hardware may reside on a service. The application logic, software or an instruction set is preferably maintained on any one of various conventional computer-readable media. In the context of this document, a "computer-readable medium" may be any media or means that can contain, store, communicate, propagate or transport the instructions for use by or in connection with an instruction execution system, apparatus, or device.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

What is claimed is:

1. A method, comprising:
    displaying, at an electronic device, a plurality of selectable objects, each of the plurality of selectable objects having a selection area;
    determining that a starting location of a first user input is within a selection area of a first object of the plurality of selectable objects and displaying an expanded selection area for only the first object, wherein the expanded selection area has a boundary that overlaps with and at least partially covers an initial selection area of at least one second selectable object;
    based at least in part on a final location of the first user input being within the expanded selection area of the first object, selecting the first object; and
    displaying a selection indicator representing the selection of the first object, wherein the first user input is a dragging operation and wherein the starting location is a starting location of the dragging and the final location is a release location of the dragging, and
    wherein the expanded selection area is centered on the selection area of the first object and is expanding a fixed number of pixels from the each side of the selection area and overlapping at least a part of another selection area adjacent to the selected selection area.

2. The method of claim 1 wherein the at least one second selectable object that the boundary overlaps with is not expanded.

3. The method of claim 2, further comprising:
    detecting a second user input; and
    in response to the second user input:
        activating a feature associated with the first object; and
        removing the selection indicator representing the selection of the first object.

4. The method of claim 1 further comprising:
    determining that the final location of the first user input is outside the expanded selection area of the first object; and
    displaying an expanded selection area for a second object associated with the final location outside the expanded selection area.

5. The method of claim 4, further comprising displaying a selection indicator representing a selection of the second object.

6. The method of claim 5, further comprising:
    detecting a second user input; and
    in response to the second user input:
        activating a feature associated with the second object; and
        removing the selection indicator representing the selection of the second object.

7. The method of claim 1 wherein the plurality of selectable objects comprises at least one of: a plurality of selectable objects of a virtual keyboard, a plurality of icons, and a combination thereof.

8. The method of claim 1 wherein after the expanded selection area is displayed, the only selection area for selecting the first object is the expanded selection area.

9. An apparatus, comprising:
    a processor; and
    at least one memory including software program code, where the at least one memory and the software program code are configured, with the processor, to cause the apparatus to at least:
    display, with a user interface, a plurality of selectable objects on a display, each of the plurality of selectable objects having a selection area;
    determine that a starting location of a first user input is within a selection area of a first object of the plurality of selectable objects and display an expanded selection area for only the first object, wherein the expanded selection area has a boundary that overlaps with and at least partially covers an initial selection area of at least one second selectable object;
    based at least in part on a final location of the first user input being within the expanded selection area of the first object, select the first object; and
    display a selection indicator representing the selection of the first object,
    wherein the first user input is a dragging operation and wherein the starting location is a starting location of the dragging and the final location is a release location of the dragging, and
    wherein the expanded selection area is centered on the selection area of the first object and is expanding a fixed number of pixels from the each side of the selection area and overlapping at least a part of another selection area adjacent to the selected selection area.

10. The apparatus of claim 9 wherein the at least one second selectable object that the boundary overlaps with is not expanded.

11. The apparatus of claim 10, wherein the at least one memory and the software program code is configured with the processor to cause the apparatus to:
    detect a second user input;
    in response to the second user input, activate a feature associated with the first object; and
    remove the selection indicator representing the selection of the first object.

12. The apparatus of claim 9 wherein the at least one memory and the software program code is configured with the processor cause the apparatus, based on the final location of the first user input being outside the expanded selection area of the first object, to display an expanded selection area for a second object associated with the final location outside the expanded selection area.

13. The apparatus of claim 12, wherein the at least one memory and the software program code is configured with the processor to cause the apparatus to display a selection indicator representing a selection of the second object.

14. The apparatus of claim 13, wherein the at least one memory and the software program code is configured with the processor to cause the apparatus to:
    detect a second user input;
    in response to the second user input, activate a feature associated with the second object; and
    remove the selection indicator representing the selection of the second object.

15. The apparatus of claim 9 wherein the plurality of selectable objects comprises a plurality of selectable objects of a virtual keyboard.

16. The apparatus of claim 9 wherein the plurality of selectable objects comprises a plurality of icons.

17. The apparatus of claim 9 wherein the user interface is a touch screen.

18. A method, comprising:
    displaying a plurality of selectable objects, each of the plurality of selectable objects having an initial selection area;
    receiving a user touch input within the initial selection area of a first selectable object to select the first selectable object;
    in response to the user touch input within the initial selection area of the first selectable object displaying an expanded selection area for only the first selectable object, where the expanded selection area has a boundary that overlaps with and at least partially covers an initial selection area of at least one second selectable object; and in response to a termination of the user touch input at a location that remains within the boundary of the expanded selection area for the first selectable object, selecting only the first selectable object and not the at least one second selectable object upon the release of the user touch input within the boundary of the expanded selection area, wherein the user touch input is a dragging operation and wherein the initial selection area is a starting location of the dragging and the termination location is a release location of the dragging, and wherein the expanded selection area is centered on the selection area of the first object and is expanding a fixed number of pixels from the each side of the selection area and overlapping at least a part of another selection area adjacent to the selected selection area.

\* \* \* \* \*